(12) United States Patent
Hoehnel (10) Patent No.: US 10,962,557 B2
(45) Date of Patent: Mar. 30, 2021

(54) METHOD OF OPERATING A LABORATORY SAMPLE DISTRIBUTION SYSTEM, LABORATORY SAMPLE DISTRIBUTION SYSTEM AND LABORATORY AUTOMATION SYSTEM

(71) Applicant: Roche Diagnostics Operations, Inc., Indianapolis, IN (US)

(72) Inventor: Falk Hoehnel, Guending (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 356 days.

(21) Appl. No.: 16/021,219

(22) Filed: Jun. 28, 2018

(65) Prior Publication Data

US 2019/0018027 A1    Jan. 17, 2019

(30) Foreign Application Priority Data

Jul. 13, 2017   (EP) .................................... 17181287

(51) Int. Cl.
  *G01N 35/00*  (2006.01)
  *G01N 35/04*  (2006.01)
  *B65G 54/02*  (2006.01)

(52) U.S. Cl.
  CPC ...  *G01N 35/0092* (2013.01); *G01N 35/00722* (2013.01); *G01N 35/00732* (2013.01); *G01N 35/00871* (2013.01); *G01N 35/04* (2013.01); *B65G 54/02* (2013.01); *G01N 2035/0096* (2013.01); *G01N 2035/00326* (2013.01);

(Continued)

(58) Field of Classification Search
  None
  See application file for complete search history.

(56) References Cited

U.S. PATENT DOCUMENTS 3,273,727 A  9/1966 Rogers et al.
3,653,485 A  4/1972 Donlon
(Continued)

FOREIGN PATENT DOCUMENTS

CN    201045617 Y    4/2008
CN    102109530 A    6/2011
(Continued)

*Primary Examiner* — Kathryn Wright
(74) *Attorney, Agent, or Firm* — Roche Diagnostics Operations, Inc.

(57) ABSTRACT

A method of operating a laboratory sample distribution system is presented. The system comprises container carriers, a gateway having a network interface, and transport modules. Each module comprises a transport surface and are adjacent in a row-direction and column-direction to form a transport surface. The module comprises a driver arranged below the transport surface to move container carriers on the transport surface and left, right, upper and lower network interfaces. The left and right network interfaces connect modules in rows and the upper and lower network interfaces connect modules in columns. The network interface of the gateway is connected to a network interface of a first module. The method comprises sending an explore command from the gateway to the first module, propagating an initialization command from the first module to the remaining modules, storing addresses within the modules, and using the addresses by the gateway to address the modules.

4 Claims, 3 Drawing Sheets

(52) U.S. Cl.
CPC .............. *G01N 2035/00881* (2013.01); *G01N 2035/0406* (2013.01); *G01N 2035/0477* (2013.01); *G01N 2035/0489* (2013.01)

(56) References Cited

U.S. PATENT DOCUMENTS

| | | | |
|---|---|---|---|
| 3,901,656 A | 8/1975 | Durkos et al. |
| 4,150,666 A | 4/1979 | Brush |
| 4,395,164 A | 7/1983 | Beltrop et al. |
| 4,544,068 A | 10/1985 | Cohen |
| 4,771,237 A | 9/1988 | Daley |
| 5,120,506 A | 6/1992 | Saito et al. |
| 5,295,570 A | 3/1994 | Grecksch et al. |
| 5,309,049 A | 5/1994 | Kawada et al. |
| 5,457,368 A | 10/1995 | Jacobsen et al. |
| 5,523,131 A | 6/1996 | Isaacs et al. |
| 5,530,345 A | 6/1996 | Murari et al. |
| 5,636,548 A | 6/1997 | Dunn et al. |
| 5,641,054 A | 6/1997 | Mod et al. |
| 5,651,941 A | 7/1997 | Stark et al. |
| 5,720,377 A | 2/1998 | Lapeus et al. |
| 5,735,387 A | 4/1998 | Polaniec et al. |
| 5,788,929 A | 8/1998 | Nesti |
| 6,045,319 A | 4/2000 | Uchida et al. |
| 6,062,398 A | 5/2000 | Thalmayr |
| 6,141,602 A | 10/2000 | Igarashi et al. |
| 6,151,535 A | 11/2000 | Ehlers |
| 6,184,596 B1 | 2/2001 | Ohzeki |
| 6,191,507 B1 | 2/2001 | Peltier et al. |
| 6,206,176 B1 | 3/2001 | Blonigan et al. |
| 6,255,614 B1 | 7/2001 | Yamakawa et al. |
| 6,260,360 B1 | 7/2001 | Wheeler |
| 6,279,728 B1 | 8/2001 | Jung et al. |
| 6,293,750 B1 | 9/2001 | Cohen et al. |
| 6,429,016 B1 | 8/2002 | McNeil |
| 6,444,171 B1 | 9/2002 | Sakazume et al. |
| 6,571,934 B1 | 6/2003 | Thompson et al. |
| 7,028,831 B2 | 4/2006 | Veiner |
| 7,078,082 B2 | 7/2006 | Adams |
| 7,122,158 B2 | 10/2006 | Itoh |
| 7,278,532 B2 | 10/2007 | Martin |
| 7,326,565 B2 | 2/2008 | Yokoi et al. |
| 7,425,305 B2 | 9/2008 | Itoh |
| 7,428,957 B2 | 9/2008 | Schaefer |
| 7,578,383 B2 | 8/2009 | Itoh |
| 7,597,187 B2 | 10/2009 | Bausenwein et al. |
| 7,850,914 B2 | 12/2010 | Veiner et al. |
| 7,858,033 B2 | 12/2010 | Itoh |
| 7,875,254 B2 | 1/2011 | Garton et al. |
| 7,939,484 B1 | 5/2011 | Loeffler et al. |
| 8,240,460 B1 | 8/2012 | Bleau et al. |
| 8,281,888 B2 | 10/2012 | Bergmann |
| 8,502,422 B2 | 8/2013 | Lykkegaard |
| 8,796,186 B2 | 8/2014 | Shirazi |
| 8,833,544 B2 | 9/2014 | Stoeckle et al. |
| 8,973,736 B2 | 3/2015 | Johns et al. |
| 9,056,720 B2 | 6/2015 | Van De Loecht et al. |
| 9,097,691 B2 | 8/2015 | Onizawa et al. |
| 9,187,268 B2 | 11/2015 | Denninger et al. |
| 9,211,543 B2 | 12/2015 | Ohga et al. |
| 9,239,335 B2 | 1/2016 | Heise et al. |
| 9,423,410 B2 | 8/2016 | Buehr |
| 9,423,411 B2 | 8/2016 | Riether |
| 9,567,167 B2 | 2/2017 | Sinz |
| 9,575,086 B2 | 2/2017 | Heise et al. |
| 9,593,970 B2 | 3/2017 | Sinz |
| 9,598,243 B2 | 3/2017 | Denninger et al. |
| 9,618,525 B2 | 4/2017 | Malinowski et al. |
| 9,658,241 B2 | 5/2017 | Riether et al. |
| 9,664,703 B2 | 5/2017 | Heise et al. |
| 9,772,342 B2 | 9/2017 | Riether |
| 9,791,468 B2 | 10/2017 | Riether et al. |
| 9,810,706 B2 | 11/2017 | Riether et al. |
| 9,902,572 B2 | 2/2018 | Mahmudimanesh et al. |
| 9,939,455 B2 | 4/2018 | Schneider et al. |
| 9,952,242 B2 | 4/2018 | Riether |
| 9,969,570 B2 | 5/2018 | Heise et al. |
| 9,989,547 B2 | 6/2018 | Pedain |
| 10,197,586 B2 | 2/2019 | Sinz et al. |
| 10,288,634 B2 | 5/2019 | Kaeppeli |
| 2002/0009391 A1 | 1/2002 | Marquiss et al. |
| 2003/0092185 A1 | 5/2003 | Qureshi et al. |
| 2004/0050836 A1 | 3/2004 | Nesbitt et al. |
| 2004/0084531 A1 | 5/2004 | Itoh |
| 2005/0061622 A1 | 3/2005 | Martin |
| 2005/0109580 A1 | 5/2005 | Thompson |
| 2005/0194333 A1 | 9/2005 | Veiner et al. |
| 2005/0196320 A1 | 9/2005 | Veiner et al. |
| 2005/0226770 A1 | 10/2005 | Allen et al. |
| 2005/0242963 A1 | 11/2005 | Oldham et al. |
| 2005/0247790 A1 | 11/2005 | Itoh |
| 2005/0260101 A1 | 11/2005 | Nauck et al. |
| 2005/0271555 A1 | 12/2005 | Itoh |
| 2006/0000296 A1 | 1/2006 | Salter |
| 2006/0047303 A1 | 3/2006 | Ortiz et al. |
| 2006/0219524 A1 | 10/2006 | Kelly et al. |
| 2007/0116611 A1 | 5/2007 | DeMarco |
| 2007/0210090 A1 | 9/2007 | Sixt et al. |
| 2007/0248496 A1 | 10/2007 | Bondioli et al. |
| 2007/0276558 A1 | 11/2007 | Kim |
| 2008/0012511 A1 | 1/2008 | Ono |
| 2008/0029368 A1 | 2/2008 | Komori |
| 2008/0056328 A1 | 3/2008 | Rund et al. |
| 2008/0131961 A1 | 6/2008 | Crees et al. |
| 2009/0004732 A1 | 1/2009 | LaBarre et al. |
| 2009/0022625 A1 | 1/2009 | Lee et al. |
| 2009/0081771 A1 | 3/2009 | Breidford et al. |
| 2009/0128139 A1 | 5/2009 | Drenth et al. |
| 2009/0142844 A1 | 6/2009 | Le Comte |
| 2009/0180931 A1 | 7/2009 | Silbert et al. |
| 2009/0322486 A1 | 12/2009 | Gerstel |
| 2010/0000250 A1 | 1/2010 | Sixt |
| 2010/0152895 A1 | 6/2010 | Dai |
| 2010/0175943 A1* | 7/2010 | Bergmann ........... H02K 41/025 180/168 |
| 2010/0186618 A1 | 7/2010 | King et al. |
| 2010/0255529 A1 | 10/2010 | Cocola et al. |
| 2010/0300831 A1 | 12/2010 | Pedrazzini |
| 2010/0312379 A1 | 12/2010 | Pedrazzini |
| 2011/0050213 A1 | 3/2011 | Furukawa |
| 2011/0124038 A1 | 5/2011 | Bishop et al. |
| 2011/0172128 A1 | 7/2011 | Davies et al. |
| 2011/0186406 A1 | 8/2011 | Kraus et al. |
| 2011/0287447 A1 | 11/2011 | Norderhaug et al. |
| 2012/0009087 A1 | 1/2012 | Okubo |
| 2012/0037696 A1 | 2/2012 | Lavi |
| 2012/0129673 A1 | 5/2012 | Fukugaki et al. |
| 2012/0178170 A1 | 7/2012 | Van Praet |
| 2012/0211645 A1 | 8/2012 | Tullo et al. |
| 2012/0275885 A1 | 11/2012 | Furrer et al. |
| 2012/0282683 A1 | 11/2012 | Mototsu |
| 2012/0295358 A1 | 11/2012 | Ariff et al. |
| 2012/0310401 A1 | 12/2012 | Shah |
| 2013/0034410 A1* | 2/2013 | Heise ................... G01N 35/04 414/222.13 |
| 2013/0153677 A1 | 6/2013 | Leen et al. |
| 2013/0180824 A1 | 7/2013 | Kleinikkink et al. |
| 2013/0263622 A1 | 10/2013 | Mullen et al. |
| 2013/0322992 A1 | 12/2013 | Pedrazzini |
| 2014/0170023 A1 | 6/2014 | Saito et al. |
| 2014/0234949 A1 | 8/2014 | Wasson et al. |
| 2015/0014125 A1 | 1/2015 | Hecht |
| 2015/0140668 A1 | 5/2015 | Mellars et al. |
| 2015/0166265 A1 | 6/2015 | Pollack et al. |
| 2015/0241457 A1 | 8/2015 | Miller |
| 2015/0273468 A1 | 10/2015 | Croquette et al. |
| 2015/0273691 A1 | 10/2015 | Pollack |
| 2015/0276775 A1 | 10/2015 | Mellars et al. |
| 2015/0276782 A1 | 10/2015 | Riether |
| 2015/0316974 A1* | 11/2015 | Jeon ..................... G06F 13/4247 710/110 |
| 2016/0003859 A1 | 1/2016 | Wenczel et al. |
| 2016/0025756 A1 | 1/2016 | Pollack et al. |
| 2016/0054341 A1 | 2/2016 | Edelmann |

(56) References Cited

U.S. PATENT DOCUMENTS

| | | |
|---|---|---|
| 2016/0229565 A1 | 8/2016 | Margner |
| 2016/0274137 A1 | 9/2016 | Baer |
| 2016/0282378 A1 | 9/2016 | Malinowski et al. |
| 2016/0341750 A1 | 11/2016 | Sinz et al. |
| 2016/0341751 A1 | 11/2016 | Huber et al. |
| 2017/0059599 A1 | 3/2017 | Riether |
| 2017/0097372 A1 | 4/2017 | Heise et al. |
| 2017/0101277 A1 | 4/2017 | Malinowski |
| 2017/0108522 A1 | 4/2017 | Baer |
| 2017/0131307 A1 | 5/2017 | Pedain |
| 2017/0131310 A1 | 5/2017 | Volz et al. |
| 2017/0138971 A1 | 5/2017 | Heise et al. |
| 2017/0168079 A1 | 6/2017 | Sinz |
| 2017/0174448 A1 | 6/2017 | Sinz |
| 2017/0184622 A1 | 6/2017 | Sinz et al. |
| 2017/0248623 A1 | 8/2017 | Kaeppeli et al. |
| 2017/0248624 A1 | 8/2017 | Kaeppeli et al. |
| 2017/0363608 A1 | 12/2017 | Sinz |
| 2018/0067141 A1 | 3/2018 | Mahmudimanesh et al. |
| 2018/0074087 A1 | 3/2018 | Heise et al. |
| 2018/0106821 A1 | 4/2018 | Vollenweider et al. |
| 2018/0128848 A1 | 5/2018 | Schneider et al. |
| 2018/0156835 A1 | 6/2018 | Hassan |
| 2018/0188280 A1 | 7/2018 | Malinowski |
| 2018/0210000 A1 | 7/2018 | van Mierlo |
| 2018/0210001 A1 | 7/2018 | Reza |
| 2018/0217174 A1 | 8/2018 | Malinowski |
| 2018/0224476 A1 | 8/2018 | Birrer et al. |
| 2018/0340951 A1 | 11/2018 | Kaeppell |
| 2018/0340952 A1 | 11/2018 | Kaeppeli et al. |
| 2018/0348244 A1 | 12/2018 | Ren |
| 2018/0348245 A1 | 12/2018 | Schneider et al. |
| 2019/0018027 A1 | 1/2019 | Hoehnel |
| 2019/0076845 A1 | 3/2019 | Huber et al. |
| 2019/0076846 A1 | 3/2019 | Durco et al. |
| 2019/0086433 A1 | 3/2019 | Hermann et al. |
| 2019/0094251 A1 | 3/2019 | Malinowski |
| 2019/0094252 A1 | 3/2019 | Waser et al. |
| 2019/0101468 A1 | 4/2019 | Haldar |
| 2019/0285660 A1 | 9/2019 | Kopp et al. |
| 2020/0200783 A1 | 6/2020 | Durco |

FOREIGN PATENT DOCUMENTS

| | | |
|---|---|---|
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0775650 A1 | 5/1997 |
| EP | 0916406 A2 | 5/1999 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2502675 B1 | 2/2014 |
| EP | 2887071 A1 | 6/2015 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-290101 A | 11/1988 |
| JP | 1148966 A | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2006-106008 A | 4/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2013-172009 A | 2/2013 |
| JP | 2013-190400 A | 9/2013 |
| SU | 685591 A1 | 9/1979 |
| WO | 1996/036437 A1 | 11/1996 |
| WO | 2003/042048 A3 | 5/2003 |
| WO | 2007/024540 A1 | 3/2007 |
| WO | 2008/133708 A1 | 11/2008 |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2012/158520 A1 | 11/2012 |
| WO | 2012/158541 A1 | 11/2012 |
| WO | 2013/152089 A1 | 10/2013 |
| WO | 2013/169778 A1 | 11/2013 |
| WO | 2013/177087 A2 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |

\* cited by examiner

METHOD OF OPERATING A LABORATORY SAMPLE DISTRIBUTION SYSTEM, LABORATORY SAMPLE DISTRIBUTION SYSTEM AND LABORATORY AUTOMATION SYSTEM

CROSS-REFERENCE TO RELATED APPLICATIONS

This application claims priority to EP 17181287.8, filed Jul. 13, 2017, which is hereby incorporated by reference.

BACKGROUND

The present disclosure generally relates to a method of operating a laboratory sample distribution system, to a laboratory sample distribution system and to a laboratory automation system comprising a laboratory sample distribution system.

There is a need for a method of operating a laboratory sample distribution system, a laboratory sample distribution system and a laboratory automation system comprising a laboratory sample distribution system, being highly scalable and modular, and providing an easy addressing scheme

SUMMARY

According to the present disclosure, a method of operating a laboratory sample distribution system is presented. The laboratory sample distribution system can comprise a plurality of sample container carriers, a gateway having a network interface, and a plurality of transport modules. Each transport module can comprise a transport surface. The transport modules can be arrangeable adjacent to one another in a row-direction (x) and in a column-direction (y) such that the transport surfaces of the transport modules together form a common transport surface. Each transport module can also comprise a controllable driver arranged below the transport surface and configured to move sample container carriers on the transport surface, a left network interface, a right network interface, an upper network interface, and a lower network interface. The left network interfaces and the right network interfaces can be configured to connect transport modules arranged adjacent to one another in the row-direction (x) and the upper network interfaces and the lower network interfaces can be configured to connect transport modules arranged adjacent to one another in the column-direction (y). The network interface of the gateway can be connected to a network interface of a first transport module. The method can comprise sending an explore command from the gateway to the first transport module, propagating an initialization command from the first transport module to the remaining transport modules, and storing addresses within the transport modules. A stored address of a respective transport module can correspond to a column (C0 to C6) and to a row (R0 to R8) in which the corresponding transport module is positioned. The method can also comprise using the addresses by the gateway to address the transport modules.

Accordingly, it is a feature of the embodiments of the present disclosure to provide for a method of operating a laboratory sample distribution system, a laboratory sample distribution system and a laboratory automation system comprising a laboratory sample distribution system, being highly scalable and modular, in particular providing an easy addressing scheme. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A method can be intended to operate a laboratory sample distribution system.

The laboratory sample distribution system can comprise a plurality (e.g., 2 to 2000) of sample container carriers configured to carry a sample container, typically, a sample tube comprising a medical sample.

The laboratory sample distribution system can further comprise a gateway having at least one network interface, e.g., in the form of an Ethernet network interface, a generic field bus interface, a RS 485 network interface, etc. The gateway may e.g., be embodied as a personal computer (PC). The gateway may e.g., implement all necessary higher layer control functions of the laboratory sample distribution system.

The laboratory sample distribution system can further comprise a plurality (e.g., 2 to 1000) of transport modules. Each transport module can comprise a transport surface (also can be denoted as transport plane) configured to carry/support the sample container carriers.

The transport modules can be arrangeable adjacent to one another in a row-direction and in a column-direction such that the transport surfaces of the transport modules together can form a common transport surface having a dimension in row- and/or column-direction.

A respective transport module can comprise a controllable driver, e.g., in the form of electromagnets or solenoids, arranged below the respective transport surface in rows (row-direction) and columns (column-direction) and configured to move sample container carriers on/over the respective transport surface.

A respective transport module can comprise a left network interface, a right network interface, an upper network interface, and a lower network interface. The left network interfaces and the right network interfaces of the respective transport modules can be configured to connect the transport modules arranged adjacent to one another in the row-direction. Accordingly, the upper network interfaces and the lower network interfaces of the respective transport modules can be configured to connect the transport modules arranged adjacent to one another in the column-direction.

A respective transport module may comprise a control device configured to control the movement of the sample container carriers on top of the transport surface by driving the driver such that the sample container carriers can move along corresponding and individual transport paths on the transport surface. The control device may be in signal connection with the left network interface, the right network interface, the upper network interface, and the lower network interface and may store an individual address. The individual address may be used by the gateway to address and communicate with the control device of the corresponding transport module.

The network interface of the gateway can be connected to at least one interface of at least one of the transport modules. This transport module can be denoted as a first transport module.

The gateway and the number of transport modules can be configured to interact such that a method as described below can be carried out.

A laboratory automation system comprising a number of pre-analytical, analytical and/or post-analytical stations and a laboratory sample distribution system as described above being configured to transport the sample container carriers and/or sample containers between the stations is also presented. The stations may be arranged adjacent to the laboratory sample distribution system.

Pre-analytical stations may be configured to perform any kind of pre-processing of samples, sample containers and/or sample container carriers.

Analytical stations may be configured to use a sample or part of the sample and a reagent to generate a measuring signal, the measuring signal indicating if and in which concentration, if any, an analyte exists.

Post-analytical stations may be configured to perform any kind of post-processing of samples, sample containers and/or sample container carriers.

The pre-analytical, analytical and/or post-analytical stations may comprise at least one of a decapping station, a recapping station, an aliquot station, a centrifugation station, an archiving station, a pipetting station, a sorting station, a tube type identification station, a sample quality determining station, an add-on buffer station, a liquid level detection station, and a sealing/desealing station.

The method can comprise the following steps used to assign individual addresses to each of the transport modules.

Initially, the gateway can transmit an explore command to the first transport module, i.e., to the transport module having one of its network interfaces (left, right, upper or lower) connected to the network interface of the gateway. The explore command may be a command having a specific identifier characterizing this type of command.

The first transport module can receive the explore command and, in response to receiving the explore command, can transmit an initialization command to all transport modules directly connected to the first transport module. The initialization command may be a command having a specific identifier characterizing this type of command. The explore command and the initialization command may differ from one another or may be identical. The initialization command can then be propagated to the remaining transport modules successively from transport module to transport module.

In response to receiving the initialization command, addresses can be stored within the respective transport modules. A stored address of a respective transport module can correspond to a row and to a column in which the corresponding transport module is positioned.

The gateway can use the stored addresses to individually address the transport modules.

In one embodiment, the method can comprise the further steps: upon receiving the explore command by the first transport module, setting a value of a column counter and value of a row counter to a respective initial value, e.g., zero, within the first transport module and storing the column counter and the row counter within the first transport module, sending the initialization command together with or comprising the respective values of the column counter and of the row counter from first transport module to all further transport modules being directly connected to the first transport module, upon receiving the initialization command and the respective values of the column counter and of the row counter by the further transport modules, a) incrementing or decrementing the value of the received column counter and storing the incremented or decremented value of the column counter and storing the received value of the row counter within the further transport modules, if the initialization command and the values of the column counter and of the row counter are received by the left or the right network interfaces of the further transport modules, and b) incrementing or decrementing the value of the received row counter and storing the incremented or decremented value of the row counter and storing the received value of the column counter within the further transport modules, if the initialization command and the values of the column counter and of the row counter are received by the upper or the lower network interface of the further transport modules, repeating steps a) and b) for all further transport modules, until all transport modules have stored the values of their corresponding column counters and row counters, and using the values of the respective column counters and row counters as the addresses.

A value of a column counter may e.g., be incremented by 1, if the respective values are received by the left network interface of a further transport module, and a value of a column counter may e.g., be decremented by 1, if the respective values are received by the right network interface of a further transport module. Accordingly, a value of a row counter may e.g., be incremented by 1, if the respective values are received by the upper network interface of a further transport module, and a value of a row counter may e.g., be decremented by 1, if the respective values are received by the lower network interface of a further transport module In one embodiment, during transmission of messages, a respective transport module can forward a received message to an adjacent transport module arranged in the same row and/or the same column, self-evidently only if the respective transport module is not the receiver or destination of the message. A message may e.g., be a command transmitted by the gateway or a response to a command transmitted by a transport module. A message may be transmitted depending on a target address until the message is received by the receiver having the target address.

In one embodiment, the network interface of the gateway or a further network interface of the gateway can additionally be connected to an interface of a further transport module. The explore command can additionally be sent from the gateway to the further transport module.

Figure 1:
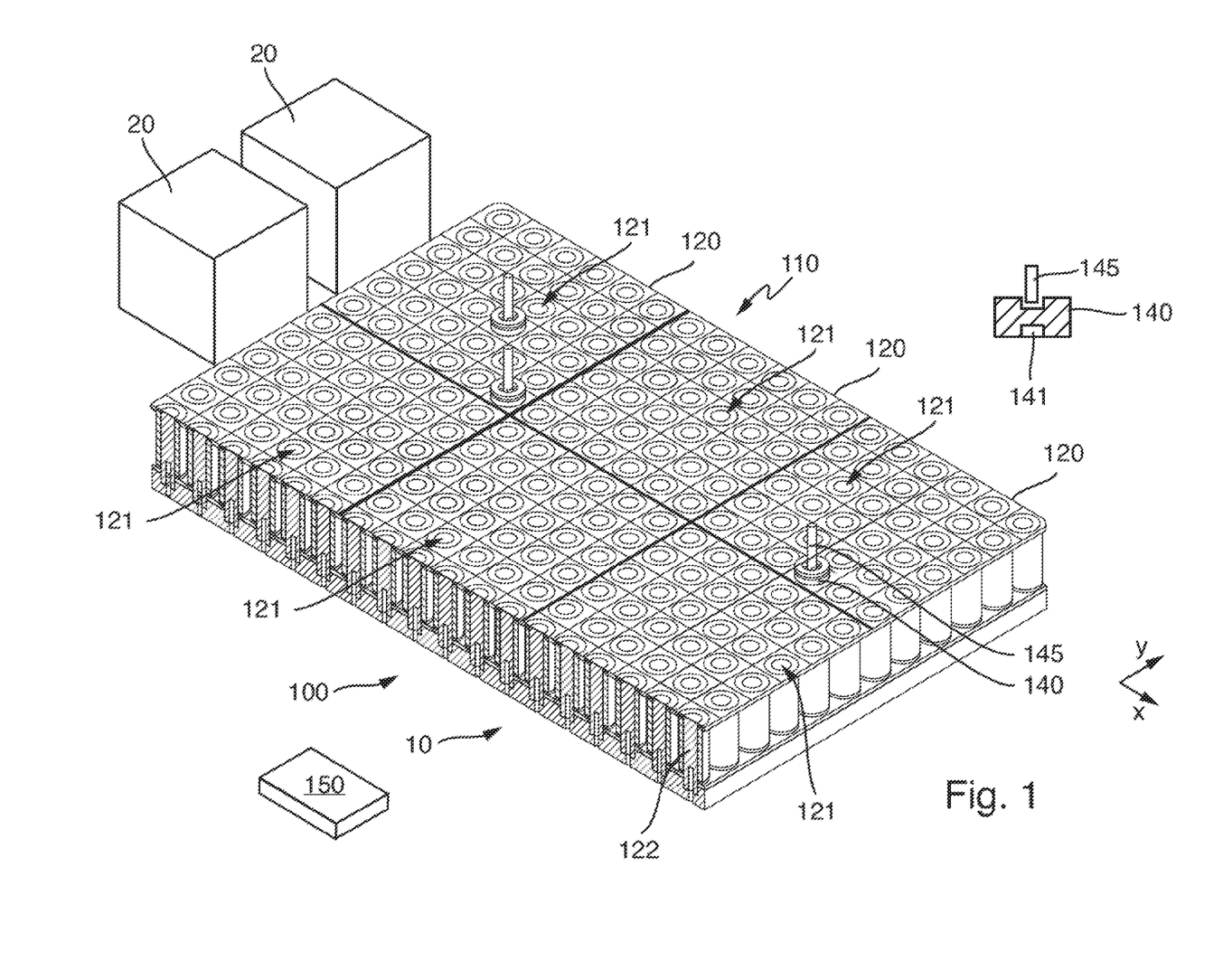
FIG. 1 illustrates a laboratory automation system according to an embodiment of the present disclosure.

Referring initially to FIG. 1, FIG. 1 shows a laboratory automation system 10 comprising a laboratory sample distribution system 100 and a two laboratory stations 20, which may be embodied as pre-analytical, analytical and/or post-analytical stations 20. The stations 20 can be arranged adjacent to the laboratory sample distribution system 100. Self-evidently, more than the two stations 20 depicted in FIG. 1 may be comprised in the laboratory automation system 10.

The laboratory sample distribution system 100 can comprise six transport modules 120 positioned adjacent to each other in a row-direction x and in a column-direction y. The transport modules 120 can respectively comprise transport surfaces 121 forming a common transport surface 110.

Under a respective transport surface 121 a plurality of electrically controllable drivers or electro-magnetic actuators in the form of electromagnets 122 can be positioned in rows and columns. The drivers 122 can be implemented as solenoids having a solid ferromagnetic core and a coil surrounding the ferromagnetic core.

Sample container carriers 140 can be positioned on the common transport surface 110 and can be moved by the drivers 122. While it can be understood that a plurality of sample container carriers 140 can be positioned on the common transport surface 110, due to simplicity only three sample container carriers 140 are depicted in FIG. 1. The sample container carrier 140 can hold a sample container 145, in which a sample to be analyzed can be contained.

Each sample container carrier 140 can comprise a magnetically active device 141 in the form of a permanent magnet positioned inside the respective sample container carrier 140. The magnetically active device 141 or permanent magnet can be configured to interact with electromagnetic fields generated by the drivers 122 for moving the sample container carrier 140 over the common transport surface 110.

The laboratory sample distribution system 100 can be adapted to transport the sample container carriers 140 and/or the sample containers 145 between the laboratory stations 20. The laboratory stations 20 can be positioned adjacent to the transport surface 110 such that a sample container carrier 140 can be used to transport a sample contained in the sample container 145 to a respective laboratory station 20.

The transport modules 120 typically can have the same size and may e.g., comprise a matrix of 6×6 drivers 122.

The laboratory sample distribution system 100 can further comprise a gateway 150 in signal communication with the transport modules 120, as will be explained in more detail below.

Figure 2:
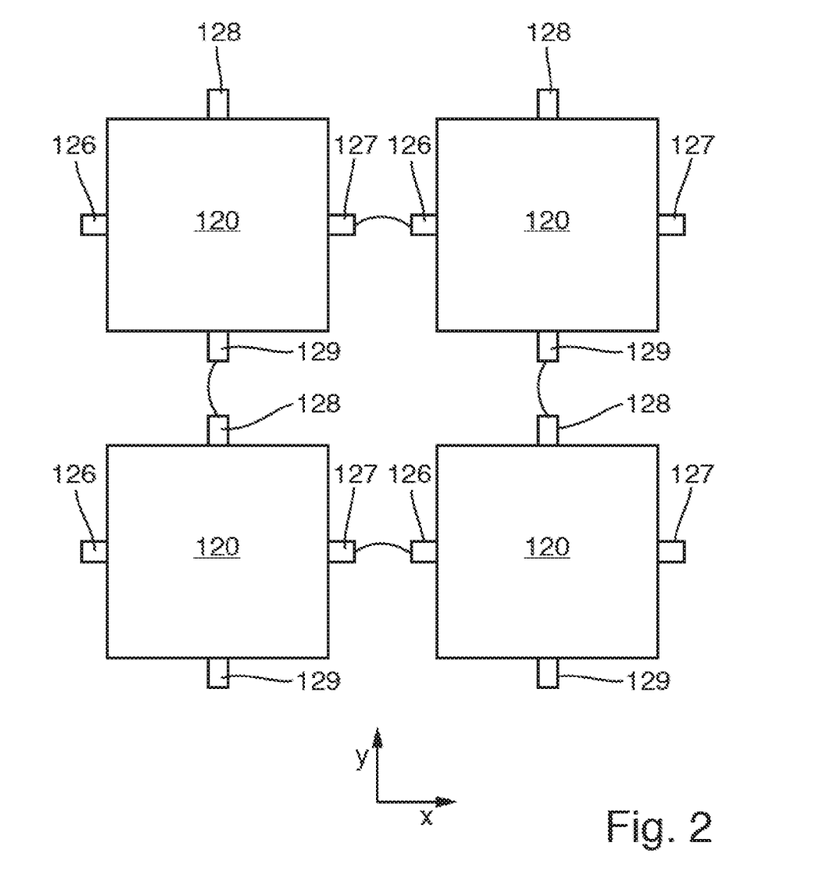
FIG. 2 illustrates shows transport modules comprised in the laboratory automation system depicted in FIG. 1 according to an embodiment of the present disclosure.

FIG. 2 shows four transport modules 120 in more detail. Each transport module 120 can comprise a left network interface 126, a right network interface 127, an upper network interface 128, and a lower network interface 129. The left network interfaces 126 and the right network interfaces 127 can be configured to connect transport modules 120 arranged adjacent to one another in the row-direction x. The upper network interfaces 128 and the lower network interfaces 129 can be configured to connect transport modules 120 arranged adjacent to one another in the column-direction y.

Figure 3:
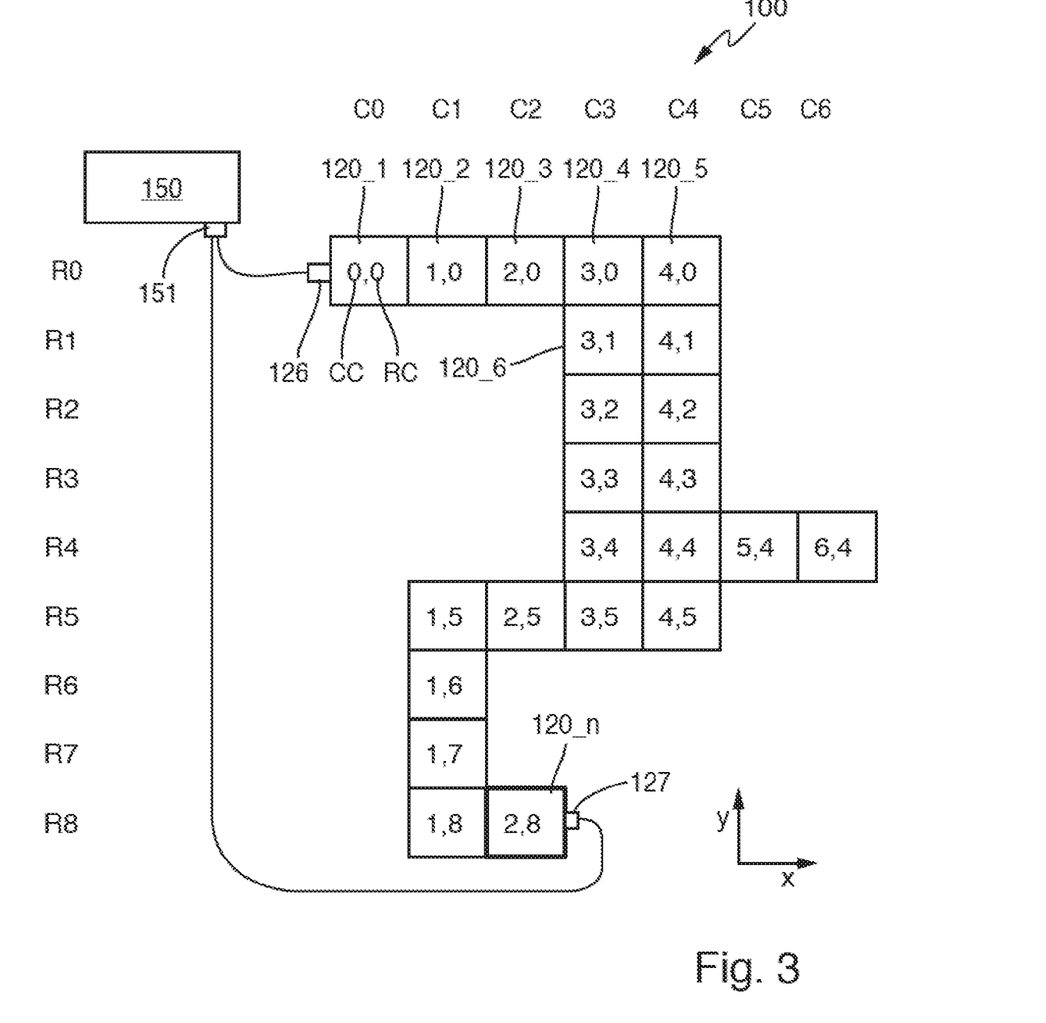
FIG. 3 illustrates a possible arrangement of transport modules having addresses assigned by the disclosed method according to an embodiment of the present disclosure.

FIG. 3 shows a possible arrangement of transport modules 120_1 to 120_n having addresses comprised of a respective column counter CC and a respective row counter RC assigned by the disclosed method as will be described below.

The gateway 150 can comprise a network interface 151. The network interface 151 of the gateway 150 can be connected to a left interface 126 of a first transport module 120_1 and can optionally be connected to a right network interface 127 of a last transport module 120_n.

The network interfaces may e.g., be Ethernet interfaces, RS 485 interfaces, or wireless interfaces.

The transport modules 120 can virtually be arranged inside a matrix having columns C0 to C6 and rows R0 to R8. A column Ci (i=0, 1, 2, . . . ) and a row Rj (j=0, 1, 2, . . . ) of a respective transport module 120_1 to 120_n in this matrix can be used as an individual address Ci/Rj of a respective transport module 120_1 to 120_n.

The method of assigning the addresses Ci/Rj comprises the following steps.

First, the gateway 150 can explore the unknown system configuration. To this purpose, the gateway 150 can send an explore command to the first transport module 120_1, thereby initiating the assignment of the addresses Ci/Rj.

When the first transport module 120_1 receives the explore command, the first transport module 120_1 can set a value of a column counter CC and a value of a row counter RC to a respective initial value of Zero (0) and store the column counter CC=0 and the row counter RC=0. Consequently, the first transport module 120_1 can now have the address CC/RC=0/0.

In a next step, the first transport module 120_1 can send a broadcast in form of an initialization command comprising the respective values of the column counter CC=0 and of the row counter RC=0 to the transport module 120_2 directly connected to the first transport module 120_1.

When the transport module 120_2 receives the initialization command, the transport module 120_2 can increment the value of the received column counter CC to the value 1, store the incremented value 1 of the column counter CC and store the received value 0 of the row counter RC, since the respective values can be received by the left network interface 126 of the further transport module 120_2. Thus, the transport module 120_2 can now have the address CC/RC=1/0.

In a next step, the transport module 120_2 can send the initialization command comprising the respective values of the columns counter CC=1 and of the row counter RC=0 to the transport module 120_3 directly connected to the further transport module 120_2. Consequently, the transport module 120_3 can now evaluate the address to CC/RC=2/0, and, after a further repetition, the transport module 120_4 can evaluate its address to CC/RC=3/0.

Since two transport modules 120_5 and 120_6 are directly connected to the transport module 120_4, two addresses may be assigned simultaneously to the transport modules 120_5 and 120_6.

Since the transport module 120_5 receives the initialization command on its left interface 126, the transport module 120_5 can increment the value of the received column counter CC to the value 4 and leave the received value of the row counter RC unchanged. Thus, the transport module 120_5 can evaluate its address to CC/RC=4/0.

Since the transport module 120_6 receives the initialization command on the upper interface 128, the transport module 120_6 can increment the received value of the row counter RC to the value 1 and leave the received value of the column counter CC unchanged. Thus, the transport module 120_6 can evaluate its address to CC/RC=3/1.

The described steps can be repeated until all transport modules 120_1 to 120_n have stored the values of their corresponding column counters CC and row counters RC.

The values of the respective column counters CC and row counters RC can be used as the individual addresses to communicate with the respective transport modules 120_1 to 120_n.

The addressing process may alternatively or additionally be initiated using the transport module 120_n.

By this method, a self-organizing network can be realized. Typically, only node-to-node connections can be used. Each node or transport module can communicate to its direct neighbors. Each transport module can forward messages towards all or to the addressed transport module. Broadcasts can run into different directions. No central bus may be necessary.

Several access points to the network can be possible. In that case, the transport module can ignore commands or messages which have already been received. For that purpose, messages may have unique IDs.

After the address assignment, every transport module knows its coordinates, the quickest uplink way to the gateway and its neighbors.

When a transport module gets a command from the gateway, it can respond to the gateway. The uplink neighbor can forward the response until the gateway receives the response.

Each transport module may comprise a Field Programmable Gate Array (FPGA) implementing the interfaces 126 to 129 and the logic of address assigning and message propagation.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A method of operating a laboratory sample distribution system, wherein the laboratory sample distribution system comprises:
    a plurality of sample container carriers,
    a gateway having a network interface, and
    a plurality of transport modules, wherein each transport module comprises
        a transport surface, wherein the transport modules are arrangeable adjacent to one another in a row-direction (x) and in a column-direction (y) such that the transport surfaces of the transport modules together form a common transport surface,
        a controllable driver arranged below the transport surface and configured to move sample container carriers on the transport surface,
        a left network interface,
        a right network interface,
        an upper network interface, and
        a lower network interface,
        wherein the left network interfaces and the right network interfaces are configured to connect transport modules arranged adjacent to one another in the row-direction (x) and the upper network interfaces and the lower network interfaces are configured to connect transport modules arranged adjacent to one another in the column-direction (y) and wherein the network interface of the gateway is connected to a network interface of a first transport module,
    the method comprising:
        (a) sending an explore command from the gateway to the first transport module, wherein upon receiving the explore command by the first transport module, setting a value of a column counter and value of a row counter to a respective initial value within the first transport module and storing the column counter and the row counter within the first transport module;
        (b) sending the initialization command together with the respective values of the column counter and of the row counter from first transport module to a further transport module directly connected to the first transport module;
        (c) propagating an initialization command from the first transport module to the remaining transport modules;
        (d) storing addresses within the transport modules, wherein a stored address of a respective transport module corresponds to a column (C0 to C6) and to a row (R0 to R8) in which the corresponding transport module is positioned; and
    using the addresses by the gateway to address the transport modules,
        wherein upon receiving the initialization command by the further transport module,
            a) incrementing or decrementing the value of the received column counter and storing the incremented or decremented value of the column counter and storing the received value of the row counter within the further transport module, if the initialization command is received by the left network interface or the right network interface of the further transport module, and
            b) incrementing or decrementing the value of the received row counter and storing the incremented or decremented value of the row counter and storing the received value of the column counter within the further transport module, if the initialization command is received by the upper network interface or the lower network interface of the further transport module;
        repeating steps a) and b) for all further transport modules, until all transport modules have stored the values of their corresponding column counters and row counters; and
        using the values of the respective column counters and row counters as the addresses.

2. The method according to claim 1, wherein during transmission of messages a respective transport module forwards a received message to an adjacent transport module arranged in the same row and/or the same column.

3. The method according to claim 1, wherein the network interface of the gateway is additionally connected to an interface of a further transport module, and wherein the explore command is additionally sent from the gateway to the further transport module.

4. A laboratory sample distribution system, the laboratory sample distribution system comprising:
    a plurality of sample container carriers;
    a gateway having a network interface; and
    a plurality of transport modules, wherein each transport module comprises,
        a transport surface, wherein the transport modules are arrangeable adjacent to one another in a row-direction (x) and in a column-direction (y) such that the transport surfaces of the transport modules together form a common transport surface,
a controllable driver arranged below the transport surface and configured to move sample container carriers on the transport surface,
a left network interface, a right network interface, an upper network interface, and a lower network interface, wherein the left network interfaces and the right network interfaces are configured to connect transport modules arranged adjacent to one another in the row-direction (x) and the upper network interfaces and the lower network interfaces are configured to connect transport modules arranged adjacent to one another in the column-direction (y) and wherein the network interface of the gateway is connected to an interface of a first transport module,
wherein the gateway and the plurality of transport modules are configured to interact such that the method of claim 1 is carried out.

* * * * *